M. P. ANDREWS.
BRICKMAKING APPARATUS.
APPLICATION FILED SEPT. 10, 1915.
1,242,120.
Patented Oct. 9, 1917.
3 SHEETS—SHEET 3.
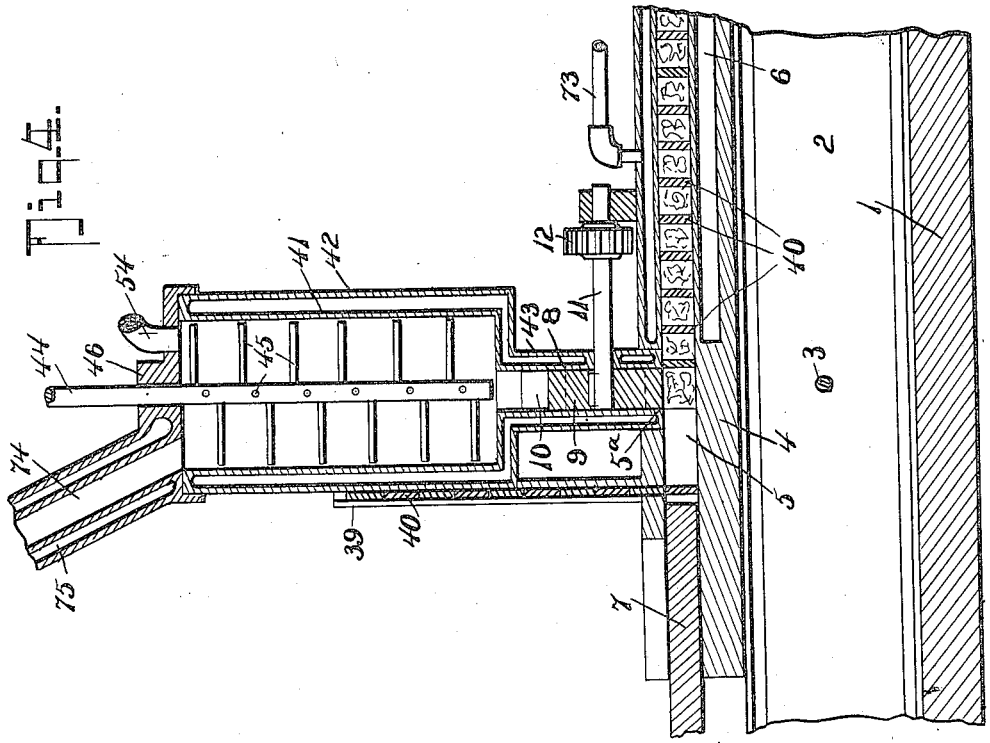
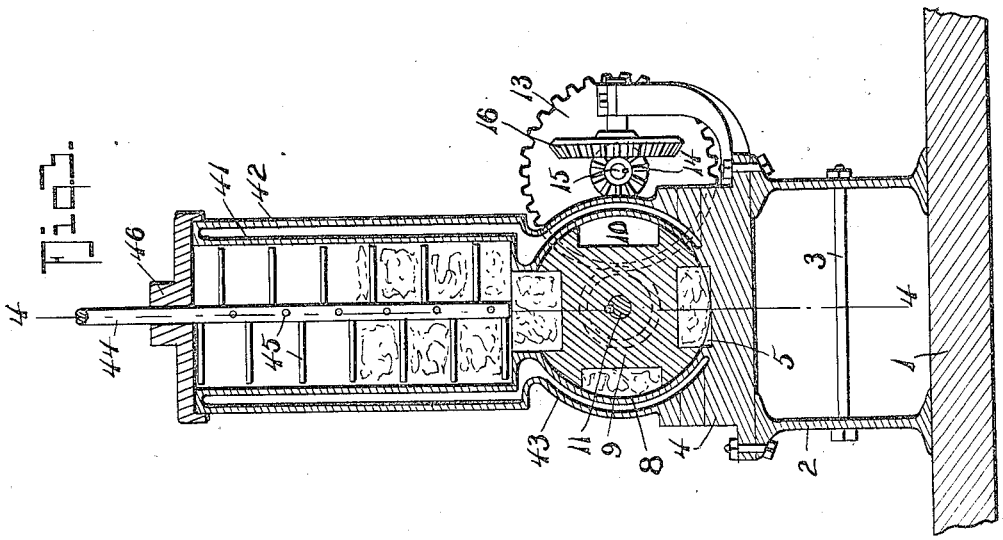
INVENTOR
Marcus P. Andrews
BY
Fred G. Dieterich Co.
ATTORNEYS
WITNESSES:

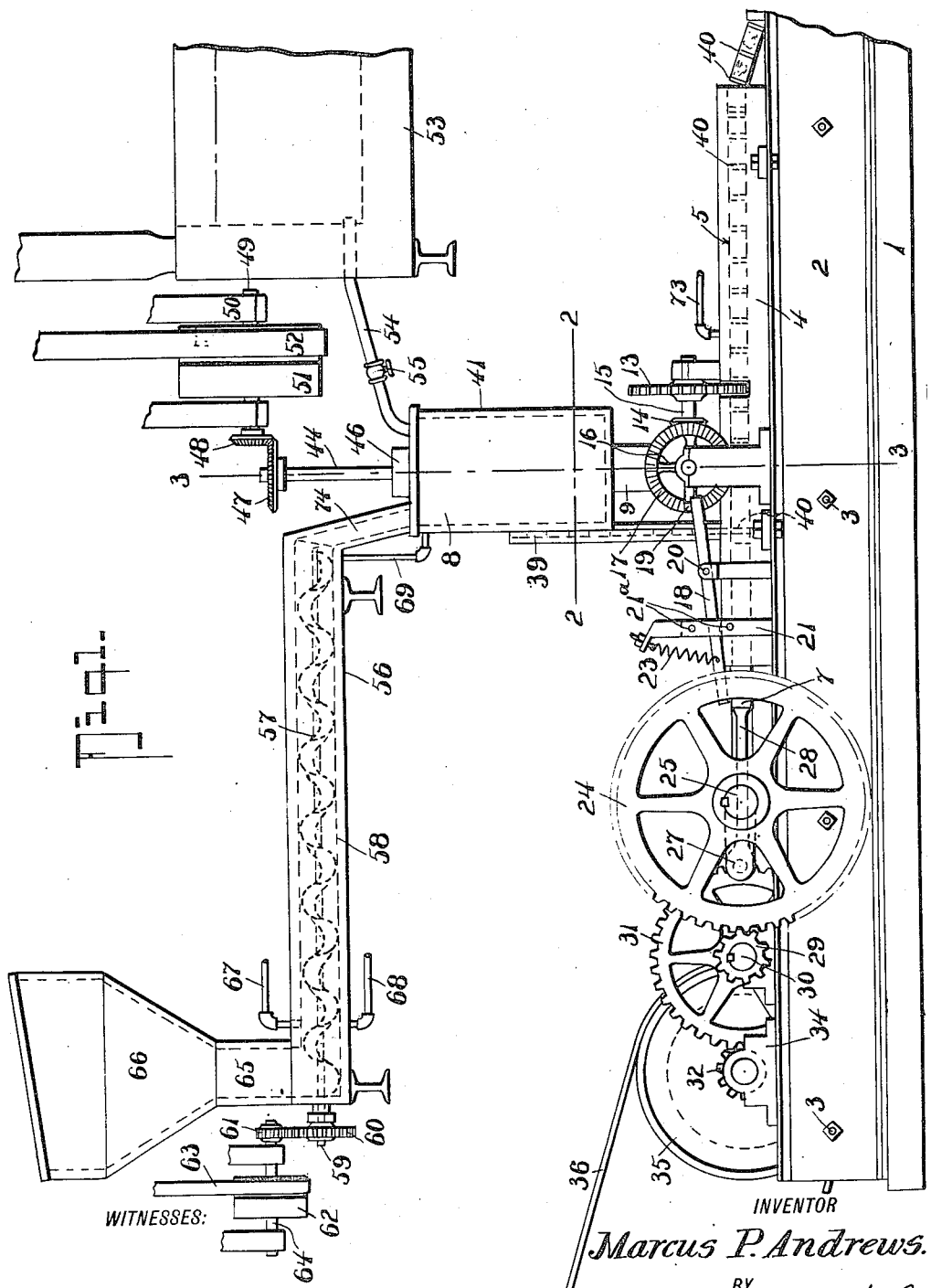

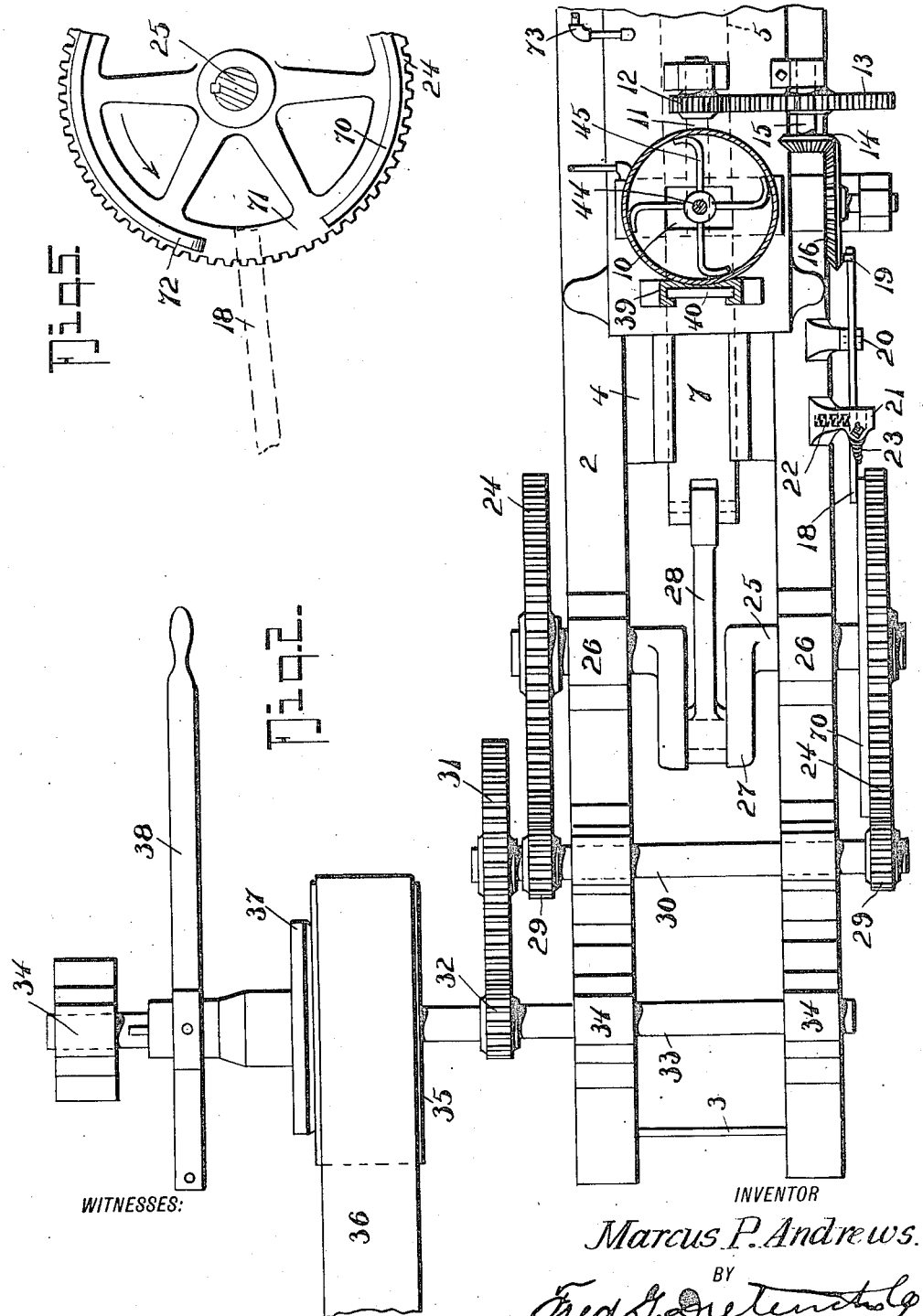

UNITED STATES PATENT OFFICE.

MARCUS PEYTON ANDREWS, OF PETERSBURG, VIRGINIA, ASSIGNOR TO ANDREWS CAOUTCHOUC PAVING BRICK COMPANY, INCORPORATED, A CORPORATION OF VIRGINIA.

BRICKMAKING APPARATUS.

1,242,120.   Specification of Letters Patent.   Patented Oct. 9, 1917.

Application filed September 10, 1915. Serial No. 49,923.

*To all whom it may concern:*

Be it known that I, MARCUS P. ANDREWS, residing at Petersburg, in the county of Dinwiddie and State of Virginia, have invented certain new and useful Improvements in Brickmaking Apparatus, of which the following is a specification.

My invention relates to the art of manufacturing paving and building blocks, which are composed of wood fiber and asphaltum or other binder, and the invention has for its object to provide an apparatus for the purposes stated, of a simple effective and inexpensive nature, whereby the operation of mixing the materials, molding the same into form and finally compressing the molded mass into blocks of a predetermined size and simultaneously cooling the same, may be effectively carried out in a single assembled plant or apparatus.

Again, the invention has for its object to provide an apparatus for carrying out, substantially, the principles residing in my Patent #1,038,501, of July 2, 1912.

In its generic nature, the invention comprises a hopper into which the wood fiber (either before or after treatment with a preservative), is introduced, and from which the fiber is conducted by a steam jacketed conveyer, preferably in an atmosphere of super-heated steam, into a steam jacketed mixer into which the binder material is admitted in the wood plastic from a liquefying tank. The apparatus also includes a molding device for receiving the mixture from the mixer and conveying it, in measured quantities, to the compressing apparatus, in which compressing apparatus the block is given its final form under pressure. The compressing apparatus section of the complete apparatus, comprises a tunnel-way having the cross sectional shape of the block through which the blocks are pressed by a plunger mechanism in a procession, each block being separated by a metallic plate, that is automatically fed into position by the plunger, the tunnel-way being surrounded by a cooling jacket whereby as the pressure is applied, the blocks may be also cooled down so that the combined action of cooling and compressing serves to reduce the blocks to their final dimensions and solidify the same.

The invention also includes the provision of the means for maintaining the contents of the feeder, the mixer and the performing feeder at a constant temperature to insure a uniformity of product.

In its more subordinate nature, the invention includes those novel details of construction, combination, and arrangement of parts all of which will be first fully described, and then be specifically pointed out in the appended claims, reference being had to the accompanying drawings, in which:—

Figure 1 is a side elevation, illustrating the invention;

Fig. 2 is a top plan and section on the line 2—2 of Fig. 1.

Fig. 3 is an enlarged cross section on the line 3—3 of Fig. 2;

Fig. 4 is an enlarged section on the line 4—4 of Fig. 3; and

Fig. 5 is a detail view illustrating the means for operating the latch lever that controls the action of the rotary conveyer, and pre-former.

In the drawings, in which like numerals of reference designate like parts in all the figures, I have shown a preferred form of the apparatus, and by reference to the drawings, it will be seen that upon a suitable foundation 1, of concrete or other solid foundation material is laid, a pair of I-beams 2, tied together at 3 to form the bed of the machine. 4 designates the body of the tunnel-way which is mounted on the beams 2 and is rigidly secured to the same, the body 4 having the tunnel-way 5 that extends through the same longitudinally from end to end.

That portion of the tunnel-way 5 on the outgoing side of the delivering opening 5ª is jacketed as at 6 to form a water space into which cooling water is admitted through a pipe 73.

7 designates the plunger which operates in the tunnel-way 5, as will be later more clearly explained and 8 indicates the casing of the rotary feeder and pre-former, the latter being in the nature of a rotary disk 9, having peripheral box 10 to receive the material from the mixer 41 and deliver it to the tunnel-way 5. The feeder disk 9 is driven by a shaft 11 and gears 12, 13, shaft 15, pinion 14 from a driving gear 16. The gear 16 is operated with a ratchet surface 17, designed to be engaged by the pawl 19, which is mounted on the end of a rocking lever 18, which is fulcrumed at 20 in a swivel bearing so as to be susceptible of a slight lateral movement, as well as a rocking movement on the pivot.

The lever 18 is guided in a guide post 21, and has movement between stops 21ª the lever being normally held in engagement with the upper stop by a spring 23 and pressed into engagement with the crank shaft gear 21 by a pressure spring 22. 25 is the crank shaft whose gears 24 which mesh with pinions 29 on a counter shaft 30. The crank shaft 25 has the crank 27, which is operatively connected with the plunger 7 by a connecting rod 28. The counter shaft 30 is driven by a gear 31 and pinion 32 from the drive shaft 33, which is mounted in bearings 34 and carries the loose pulley 35, which is driven by a driving belt 36 or in any other suitable way. A clutch 37, shiftable by a lever 38, is designed to bring the pulley 35 into fixed relation with the shaft 33 for driving purposes.

39 is the plate holding chute in which the separating plates 40 are stacked so as to automatically feed into the tunnel way in advance of the plunger 7 when the latter is in its withdrawn position.

The mixer 41 is in the nature of a cylindrical tank jacketed at 42 to receive steam for heating purposes, the jacket 42 being in communication with a jacket 43 that incloses the feeder 8. Within the mixing tank 41 is a rotary shaft 44 having mixing arms 45, the shaft 44 passing through the head bearing 46 and being driven from a counter shaft 49 by bevel pinions 47—48, the counter shaft being suitably mounted in bearings 50 and carrying fast and loose pulleys 51—52 around which a driving belt may be applied.

53 is the liquefying tank for the binding medium which is preferably asphaltum or hydrolene. The tank 53 being of the ordinary construction and connected with the mixer 8 by a duct 54 that may be provided with a shut off valve 55, if desired.

56 is the conveyer which is of the screw type and is steam jacketed at 58. The conveyer includes the screw 57 which is turned within the conveyer chamber by a shaft 59 that is driven by gear 60 and pinion 61 from a counter shaft 64 having fast and loose pulleys 62, around which the driving belt 63 passes. 66 is the hopper into which the fibrous material, such as saw dust or the like is placed and from which it flows down through the neck 65 into the entrant end of the conveyer 56. The conveyer jacket 58 is designed to receive heating steam from a pipe 68 and is also connected by pipe 69 with the steam jacket of the mixer.

67 is a pipe for conveying super-heated or dry steam into the interior of the screw conveyer to act on the wood fiber as recited in the process of my patent hereinbefore referred to.

The material from the screw conveyer is deposited into the mixer through a duct 74 that is steam jacketed at 75 and is designed to deliver the material through the top of the mixer.

The gear 17 is turned step by step so as to move the feeder disk 9 ninety degrees with each operation by the action of the lever 18. Ordinarily, the lever 18 is held with its pawl 19 out of operative engagement with the surface 17 of the gear 16 by a flange 70 on one of the gears 24. The flange 70, however, having a portion removed to leave a blank space 71 and having one end beveled at 72 so that when the lever 18 leaves the blank space 71 the spring 22 will press it over to bring the pawl 19 into engagement with the latch surface 17 and as the shoulder 72 engages the lever 18, it will be rocked on its fulcrum 20 to turn the gear 16 until the lever 18 engages the lower stop when it will be pushed out and ride up on the flange 70. As soon as this occurs, the spring 23 will draw the lever back into engagement with the upper stop ready for the next operation.

In practice, the wood fiber is introduced into the hopper 66, and the asphaltum or other binder is introduced into the tank 53 and heated to its fluid state. Heated steam at a constant temperature is introduced into the jackets 58, 41 and 43 to maintain a constant temperature in the same. The screw 57 carries the wood fiber from the hopper to the mixer where it is agitated and thoroughly mixed with the binding fluid that enters through the duct 54. As the mixture is perfected, it is fed out of the bottom of the mixer into the box 10 of the rotary feeder and pre-former 9, which carries the mixture into the tunnel 5, whereupon the flange 7 forces a plate 40 into engagement with the mixture, (it being understood that the mixture is in a semi-plastic form at this time), and presses it forward, the cooling action taking place while the pressure is being applied in the tunnel 5, beyond the place of entrance 5ª. It will be understood that the tunnel-way 5 is made of such length that the frictional resistance of the blocks passing through the tunnel-way will be sufficient to oppose the plunger and impart the desired compression or solidification to the block, so that when the block is fed out of the tunnel-way, it will be of its final density and size.

From the foregoing description, taken in connection with the accompanying drawings, it is thought that the complete construction, operation and advantages of my invention will be clear to those skilled in the art.

I claim:

1. In an apparatus of the class described, a molding and forming mechanism for receiving the composition and shaping it into blocks, said mechanism comprising a tunnel, a pre-former and feeder for delivering embryo blocks to the tunnel, separating element supplying mechanism for the blocks in the tunnel, a plunger device for pressing the blocks and forcing the same through the aforesaid parts.

2. In an apparatus of the class described, a molding and forming mechanism for receiving the composition and shaping it into blocks, said mechanism comprising a tunnel, a pre-former and feeder for delivering embryo blocks to the tunnel, separating element supplying mechanism for the blocks in the tunnel, a plunger device for pressing the blocks and forcing the same through the aforesaid parts, said operating means including a driving shaft for the pre-former, a driving shaft for the plunger device, and a mechanical movement connecting said shafts whereby rotation of the plunger device operating shaft will impart intermittent rotation to the pre-former shaft.

3. In an apparatus of the class described, a molding and forming mechanism for receiving the composition and shaping it into blocks, said mechanism comprising a tunnel, a pre-former and feeder for delivering embryo blocks to the tunnel, means for supplying separating elements for the blocks in the tunnel, a plunger device for pressing the blocks and forcing the same through the aforesaid parts, said operating means including a driving shaft for the pre-former, a driving shaft for the plunger device, and an intermittently operated pawl and ratchet device operatively connecting the respective shafts whereby movement of the plunger device will be transmitted to the pre-former shaft.

4. In an apparatus of the class described, a molding and forming mechanism for receiving the composition and shaping it into blocks, said mechanism comprising a tunnel, a pre-former and feeder for delivering embryo blocks to the tunnel, means for delivering separating elements for the blocks in the tunnel, a plunger device for pressing the blocks and forcing the same through the aforesaid parts, said operating means including a driving shaft for the pre-former, a driving shaft for the plunger device, and a pawl and ratchet cam actuated device operatively connecting said shafts whereby continuous rotation of the plunger device shaft will impart intermittent rotation to the pre-former shaft.

5. In an apparatus of the class described, a molding and forming mechanism for receiving the composition and shaping it into blocks, said mechanism comprising a tunnel, a pre-former and feeder for delivering embryo blocks to the tunnel, means for delivering separating elements for the blocks in the tunnel, a plunger device for pressing the blocks and forcing the same through the aforesaid parts, said operating means including a driving shaft for the pre-former, a driving shaft for the plunger device, a pawl and ratchet cam actuated device operatively connecting said shafts whereby continuous rotation of the plunger device shaft will impart intermittent rotation to the pre-former shaft, said pawl and ratchet cam actuated device comprising a ratchet wheel, a rocking pawl having provision for engaging said ratchet wheel and a cam driven by said plunger device shaft for engaging said pawl to rock the same at intervals and thereby impart intermittent motion to said pre-former shaft.

MARCUS PEYTON ANDREWS.

Witnesses:
 WANME D. BLANK,
 PAUL E. WEBB.